Patented Dec. 6, 1927.

1,651,688

UNITED STATES PATENT OFFICE.

HANS A. FRASCH, OF NEW YORK, N. Y.

PROCESS OF RECLAIMING WASTE LUBRICATING MINERAL OIL CONTAINING SOAPS.

No Drawing.   Application filed June 27, 1921.   Serial No. 480,661.

This invention relates to the recovery and refining of waste oils, greases and like materials as obtained in garages, railroad yards, machine shops and other places where spent oils, greases and like materials accumulate. These materials constitute a burdensome refuse which is generally all wasted, being at best utilized only for fuel purposes. The disposal of this waste or refuse is particularly difficult and inconvenient in cities where regulations prohibit the dumping of the refuse into sewers and other means of disposal are onerous.

Attempts have been made to recover useful products from this refuse by distillation; the results however have been unsatisfactory, largely owing to the presence in the waste or refuse, of oleates derived from animal or vegetable fats contained in varying amounts in the lubricating oils which constitute the larger part of the refuse. At the high temperatures necessary for distillation, the oleates become decomposed and induce a cracking of the heavier mineral oils. Furthermore, the refuse contains large amounts of carbon and finely-divided metallic impurities (grit, chiefly brass and Babbitt metal from bearings, steel from ball bearings, etc.), which cannot wholly be removed by filtration or other ordinary means.

Attempts have also been made to reclaim such waste materials by treating them with chemicals, as for example, by first dissolving in a large excess of gasolene, then adding caustic soda, then sulfuric acid and then finally neutralizing with caustic soda. In such processes the effort has always been to carry on the reactions in such a manner as not to destroy or affect the quality of the oil and to preserve conditions in such a way that the recovered oil is substantially the same in quality as the original oil. Inasmuch as the mineral oils in question owe their efficiency largely to oleates contained therein, the effort of the prior art has been to preserve these oleates in the condition in which they exist in the oils under treatment without permitting the chemical reactions to become so active or violent as to affect these oleates.

I have now found that valuable results will follow if, instead of following the precepts of the prior art, the reaction with sulfuric acid be carried out under conditions where the oleates are attacked and converted into oleic acid on the one hand and sulfates are formed on the other, provided this treatment is followed by a subsequent step in which the oleic acids produced by the sulfuric acid agent are subjected to the action of a second agent consisting preferably of an alkali. The alkali agent acts to reconvert the oleic acids formed by the acid agent into oleates having the base of the alkali agent. It will be apparent that the procedure according to my process will not preserve in the finally recovered reclaimed oil the same oleates which were present in the original oil, but that on the contrary, the oleates which are present in oils recovered according to my process are oleates having the selected base of the selected neutralizing agent. This is an advantageous feature of my new process, inasmuch as the oleates contained in mineral lubricating oils are of various kinds. Such oils may contain sodium oleates, aluminum oleates, lead oleates, calcium oleates, magnesium oleates, etc., and no given mixture of waste oils contains the same percentage of these various oleates. If, therefore, the oil is reclaimed under conditions where oleates remain unaffected by the reclaiming treatment, the product of any single reclamation will never be of the same composition as the product of a preceding or of a subsequent reclamation but the product of each reclamation will have its own mixture of oleates which does not correspond to the desired oleate content for any particular specific kind of lubricating oil. According to my process, on the other hand, the ultimate product of reclamation will be an oil containing oleates having the selected base of the selected neutralizing agent, i. e., containing for example, sodium oleate and the product is available for use and is not a nondescript inharmonious mixture.

Incidentally, my invention also removes the solid impurities of the oil mixture and does not interfere with the recovery of light, volatile constituents while reclaiming or recovering the heavier lubricating oils and greases in a form where they are again rendered available for lubricating purposes.

As a first example or illustration of my invention, I will refer to the treatment of the promiscuous mixture of waste oils and greases accumulating in automobile garages, and consisting of various oils (such as spent oil from crankshaft cases, light oils for cleansing gears, other refuse oils from various sources), greases from bearings, differentials, etc., together with waste products resulting from the operation of internal combustion engines, such as the carbon and metal fragments mentioned above, dust, etc.

Such garage refuse, according to my present invention, is first exposed, generally at ordinary temperature, to the action of sulfuric acid, the strength of which may be varied within wide limits; a 60° B. acid will produce satisfactory results, but I may employ stronger acid, say of 66° B., or weaker acid, say 40° B., but I do not wish to imply that these are the upper and lower limits of permissible strength. Before or after this treatment with sulfuric acid, I may separate, by distillation, any light oils, such as gasoline, which the refuse may contain. The treatment with sulfuric acid is carried out while agitating the mass, preferably by the injection of air, such agitation being preferably also used while the acid is being added to the refuse. The amount of acid employed depends on the character of the waste or residue, and should be enough to insure the decomposition of as much as may be necessary or desirable, of the oleates or corresponding salts of other fatty acids present in the refuse material, thereby setting free a corresponding amount of oleic or other fatty acids. In many cases, from 1 to 2% of surfuric acid has been found sufficient. The mixture of acid and refuse is kept under agitation until the acid is thoroughly mixed in and distributed throughout the mass, whereupon such mixture is allowed to rest, until the products of decomposition caused by the acid or resulting from the treatment with the acid, have settled. The settling of this material incidentally, by mechanical or physical action, facilitates the settling of solid impurities which are not affected by the acid. The supernatant oil and dissolved fatty acid is then separated by decanting or in any other suitable manner, and such separated oil fatty acid mixture is treated (again under agitation with air or otherwise) with an alkali (which term is to be interpreted broadly enough to include the carbonate of an alkali), for instance with a solution of sodium hydrate, until the oleic and other fatty acids freed by the preceding treatment with sulfuric acid are again transformed into oleates or the corresponding salts of other fatty acids. The amount of alkali employed should be in accordance with the quantity of oleates or corresponding salts of other fatty acids which it is desired to form from the amount of oleic and other fatty acids resulting from the decomposition effected by the sulfuric acid. The strength of the alkali (saponifying agent) solution in this case should preferably be between 10 and 30° B., and the temperature during this treatment, between 50 and 60° centigrade, it being understood that while this is the preferred range of strength and temperature, I do not desire to restrict myself thereto.

The resultant mixture is then allowed to rest until such material as is insoluble in the oil has accumulated at the bottom, while the oil floats on top, and such oil is then separated by decanting or otherwise, to be subsequently further treated for the purpose of bringing it to the condition required in view of the particular use to which the oil is to be put.

The refuse oil is composed largely of heavy mineral lubricating oils containing various amounts or percentages of oleates (or corresponding salts of other fatty acids) such as are generally used in lubricating oils; these oleates, as the result of the treatment of the refuse with sulfuric acid and with alkali as heretofore described (and specifically with sodium compounds) become transformed into alkali oleates (and specifically, sodium oleates), so that the resulting product contains either no oleates of the metals of the alkaline earths, or, (as for instance where the amount of sulfuric acid initially added to the refuse material was insufficient to convert the whole quantity of monovalent oleates present into oleic acid or where the acid may not have come into reactive contact with oleates by reason of the resistance or protection afforded by the enveloping oily material) at least a smaller amount of such oleates than the original waste material. Yet, in most cases, the final oil product should contain a certain amount of an oleate of a metal of the alkaline earths in order to be fit for the specific purpose (generally, lubrication) for which it is intended. For this reason, I add to the product resulting from the successive treatments with acid and alkali, the proper amount of such oleate or oleates as may be required to prepare the oil for any specific purpose in view. As instances of such oleates to be added, I may mention calcium oleate, aluminum oleate, and magnesium oleate. It will be understood that while in describing the above example, and also in the description of the further example given hereinafter, I have referred chiefly to oleic acid and to oleates, the invention will produce a similar effect on other fatty acids and their salts that may be present, that is, in some cases there may be, in addition to or instead of, oleates, the corresponding salts of other fatty acids, for instance stearates or palmitates, or mixtures of two or more of such salts.

When my invention is applied to the treatment of refuse grease coming from railroad cars, which refuse grease consists of cotton waste saturated with lubricants, I first employ a suitable solvent, such as gasoline, to extract the oily substance adhering to the cotton waste, and then subject the resulting solution to the hereinbefore described treatment with acid and alkali, the solvent being removed by distillation, either before or after such treatment with acid and alkali.

In either case, I decompose as much of the oleates as necessary or desired by means of sulfuric acid and remove the metallic and mechanical impurities contained in the refuse (such refuse generally consisting of waste oil or grease material containing fatty acids and organic, that is, animal or vegetable oils); and by the subsequent action of an alkali, I restore the oleates within the mass, to obtain a final product of considerable commercial value, since its properties can be adjusted accurately to the intended use. The sulfuric acid treatment decomposes the oleates or other fatty acid compounds contained in the refuse or waste material, and this decomposition results in the formation of an insoluble tarry or sticky mass which settles at the bottom as soon as agitation is discontinued, and which carries down with it by adhesion, the insoluble chemically indifferent impurities and also the mechanical impurities such as metallic grit.

It will be understood that in its broader aspects, my invention relates to the treatment of waste oil or grease materials containing soap or fatty acids, whether or not oleates be present as such in the waste material treated. While in the appended claims I have referred to oleic acid and to oleates, it will be understood from the foregoing description that other fatty acids and their salts (for instance stearates or palmitates) are equivalents of oleic acid and of oleates, and the appended claims are to be interpreted as covering such equivalents.

Various modifications may be made without departing from the nature of my invention as set forth in the appended claims.

I claim as my invention:

1. The process of reclaiming waste lubricating mineral oil containing oleates which comprises decomposing with sulfuric acid the contained oleates, forming oleic acid soluble in the mineral oil and oil-insoluble matter, separating from the oil-fatty acid mixture the oil-insoluble matter, treating the separated oil-fatty acid mixture at a temperature between 50 and 60° centigrade with an alkaline saponifying agent in sufficient amount to neutralize the oleic acid present in the oil and separating this oil-soap mixture from oil-insoluble matter.

2. The process of reclaiming waste lubricating mineral oil containing oleates which comprises distilling off from such waste mineral oil, the light oils such as gasoline contained therein, decomposing with sulfuric acid the oleates contained in such waste mineral oil, forming oleic acid soluble in the mineral oil and oil-insoluble matter, separating from the oil-fatty acid mixture the oil-insoluble matter, treating the separated oil-fatty acid mixture with an alkaline saponifying agent in sufficient amount to neutralize the oleic acid present in the oil, and separating this oil-soap mixture from oil-insoluble matter.

In testimony whereof I have signed this specification.

HANS A. FRASCH.